May 8, 1923.
C. F. GREEN
1,454,585
STORM SHIELD
Filed June 5, 1916
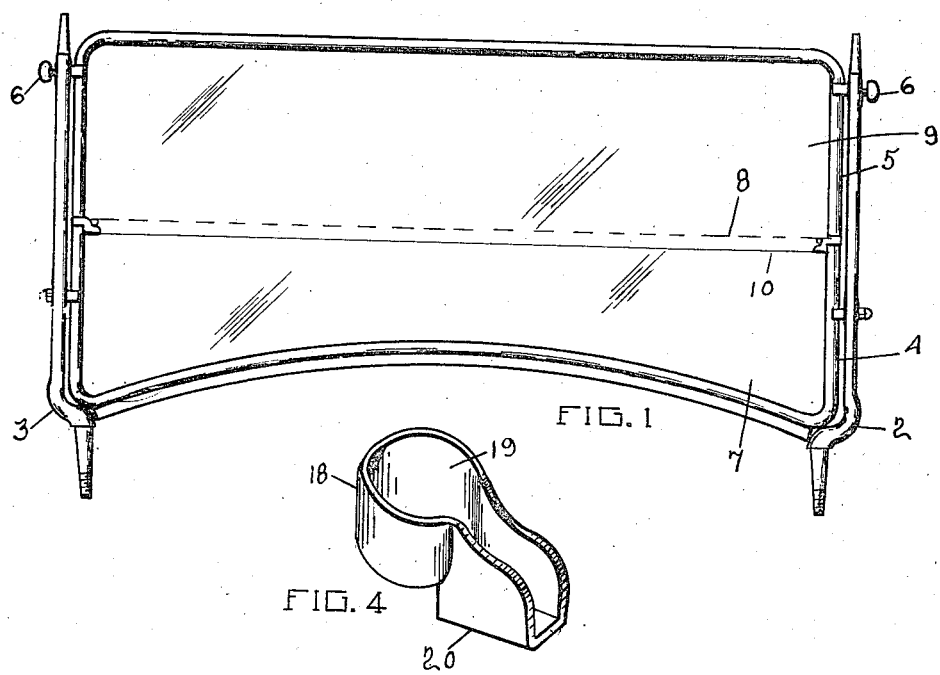
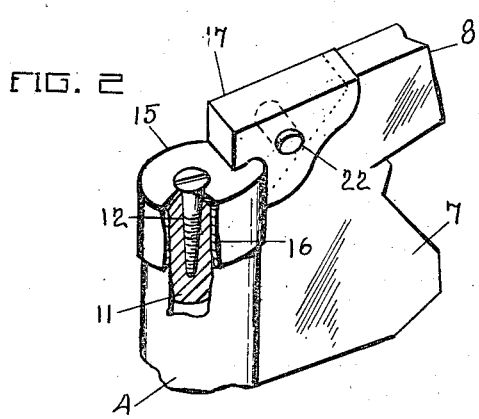
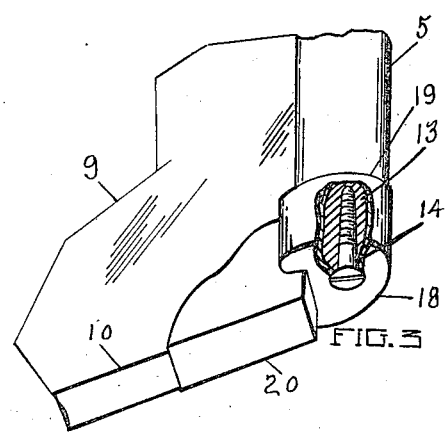
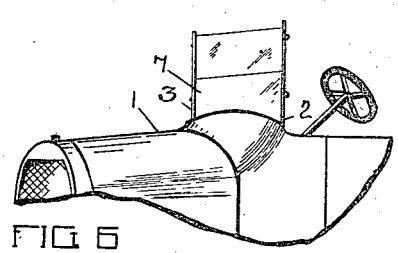
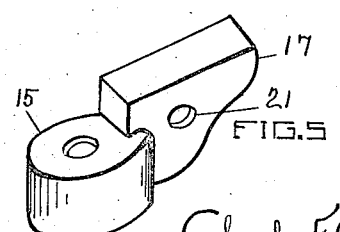
Inventor
Charles F Green
By
Geo E Kirk
Attorney Patented May 8, 1923.

1,454,585

UNITED STATES PATENT OFFICE.

CHARLES F. GREEN, OF TOLEDO, OHIO, ASSIGNOR TO THE WILLYS-OVERLAND CO., OF TOLEDO, OHIO, A CORPORATION OF OHIO.

STORM SHIELD.

Application filed June 5, 1916. Serial No. 101,663.

*To all whom it may concern:*

Be it known that I, CHARLES F. GREEN, a citizen of the United States of America, residing at Toledo, Lucas County, Ohio, have invented new and useful Storm Shields, of which the following is a specification.

This invention relates to improvements in windshield construction and has for its primary object to provide an improved construction applicable to windshields of the type in which two open ended frames are pivotally mounted in a supporting frame, each open ended frame carrying a pane of glass with the free edges of said panes of glass overlapping so as to make a rain-proof joint.

A further object of this invention is to provide an improved construction of this type of such a nature as to prevent the two windshield sections striking against each other so as to break the glass and so as to prevent objectionable noise or rattle due to vibration.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which—

Figure 1 is a view, in front elevation, of a windshield embodying my invention.

Figure 2 is a detail, perspective view of one of the upper corners of the lower shield section showing in detail one of the members for securing the free edge of the glass to the open-sided frame member.

Figure 3 is a view similar to Figure 2, but showing one of the lower corners of the upper shield section.

Figure 4 is a detail, perspective view of one of the clip members for connecting the glass to its supporting frame.

Figure 5 is a detail, perspective view of one of said clip members, taken at a different angle from the view shown in Figure 4.

Figure 6 is a fragmentary, perspective view of a motor vehicle having a windshield embodying my invention.

In the drawings similar reference numerals refer to similar parts throughout the several views.

Considering the numbered parts of the drawing I have shown a motor vehicle, to the body of which is secured the windshield supporting frame comprising the standards 2 and 3. The upper and lower open-sided frames 4 and 5 are pivotally mounted in said supporting frame by means of the pivots 6 which may be locked to hold these supporting frames in different adjusted positions. The lower frame 4 is open at its upper side and carries a pane of glass 7 having a portion 8 projecting beyond the upper ends of said frame 4. The upper frame 5 is open at its lower side and has the pane of glass 9 secured therein having a portion 10 projecting below the lower ends of said frame 5. It will be seen that the frames 4 and 5 are so mounted in the fixed supporting frame that the portions 8 and 10 overlap.

Blocks 11 and 13 respectively are secured in the ends of the tubular frame members 4 and 5, as shown in Figures 2 and 3 of the drawing. The clips are provided having a tubular socket portion 15 embracing the free ends of the frame members 4 and 5 and secured thereto by a screw 12 and a socket member 17 projects laterally from said tubular socket member 15 and embraces the corner of the free edge of the pane of glass 7 or 9 secured in the corresponding frame 4 or 5. The socket member 17 is offset laterally from the axis of the tubular socket portion 15, as well as vertically from said portion, as will be apparent from the drawing. The clip members are the same for both the upper and lower section of the shield, except that one pair of the clip members, preferably those attached to the lower frame 4, are provided with an opening 21 extending through the side wall of the laterally extending socket 17 and receiving a buffer 22 of rubber or similar resilient material. As the sections of the windshield are moved relative to and approach each other, the buffers 22 will prevent the frame of the upper section striking the lower section so as to avoid breaking the glass and it will also serve as an anti-rattling device to eliminate the objectionable noise and rattling of the windshield sections.

The clip members, connecting the free edge of the pane of glass to each supporting frame, may be pressed or stamped from sheet metal and are strong, while being of light weight, and may be made of uniform size permitting the quick assembly of the windshield without the necessity of machining any of the parts.

Having thus described my invention, what I claim as new and desire to secure by Letters Patent is:

1. A device of the class described comprising the combination of a supporting frame; open-sided frames pivotally supported in said supporting frame with their open sides facing each other; transparent shield sections carried by said open-sided frames and disposed so that the edges of said shields at the open sides of said frame will overlap; a clip member connecting the free end of each of said open-sided frames to the free edge of the transparent shield carried thereby, each of said clip members comprising a tubular socket embracing and secured to the free end of the frame member; and an integral, laterally projecting rectangular socket, embracing the corner of the free edge of said transparent shield; and a buffer carried by one of each pair of co-acting clips in position to be contacted by the other of said clips.

2. In a device of the class described, an open ended frame, a transparent shield section carried thereby, an integral clip member provided with a socket portion for receiving one end of the frame member and a second socket portion communicating with the first named socket portion, and adapted to receive and support one corner of the transparent shield, a buffer member carried by the clip member and projecting therefrom, and means for securing the clip member to the frame.

3. In a windshield, a pair of frames, one of said frames being pivoted horizontally, overlapping glasses, one mounted in each frame, clips on the corners of each frame which are adjacent to the other frame, each clip having a socket portion for receiving one end of the frame member, and a second socket portion offset vertically and laterally from the first named socket portion for receiving and holding the adjacent corner of the glass, the first named socket portion of one clip being in alignment with and close to the corresponding socket portion of the clip on the opposite frame when the windshield is closed, while the offset socket portions of the said clips overlap.

In witness whereof I affix my signature.

CHARLES F. GREEN.